United States Patent [19]

Bland et al.

[11] Patent Number: 4,549,432
[45] Date of Patent: Oct. 29, 1985

[54] METERING SEPARATOR FOR DETERMINING THE LIQUID MASS FLOW RATE IN A GAS-LIQUID OILFIELD PRODUCTION STREAM

[75] Inventors: Linden Bland, Calgary; Clifford J. Anderson, Sherwood Park, both of Canada

[73] Assignee: Murphy Oil Company Limited, Calgary, Canada

[21] Appl. No.: 572,912

[22] Filed: Jan. 23, 1984

[51] Int. Cl.$^4$ ............................................. G01F 15/08
[52] U.S. Cl. ...................................... 73/200; 73/223; 55/21; 55/160; 55/177; 55/215; 55/270
[58] Field of Search ............... 73/200, 223, 296, 861; 210/89, 188; 55/18, 21, 160, 164, 177, 215, 218, 270

[56] References Cited

U.S. PATENT DOCUMENTS

| | | | |
|---|---|---|---|
| 2,241,286 | 5/1941 | Werts | 73/200 |
| 2,610,697 | 9/1952 | Lovelady | 55/164 |
| 2,936,622 | 5/1960 | Glasgow | 73/200 |
| 2,987,366 | 6/1961 | Meyers | 73/200 |
| 3,001,399 | 9/1961 | Smith | 73/200 |
| 3,014,362 | 12/1961 | True | 73/200 |
| 3,021,709 | 2/1962 | Walker | 73/200 |
| 3,027,763 | 4/1962 | Buren | 73/200 |
| 3,365,945 | 1/1968 | Parks | 72/223 |
| 4,017,275 | 4/1977 | Hodgson | 55/177 |
| 4,426,294 | 1/1984 | Seal | 210/89 |

*Primary Examiner*—Ernest G. Therkorn
*Attorney, Agent, or Firm*—Ernest Peter Johnson

[57] ABSTRACT

The separator accepts both the casing annulus and tubing production streams issuing from an in situ combustion project production well. Most of the gas in the flow is first separated from the liquid and solids, by centrifugal action. This gas is removed from the separator. The remaining mixture is accumulated until a pre-determined weight is in hand, at which point the accumulated batch is dumped. The time taken to accumulate the batch is noted. Computational elements then determine the mass flow rate of the dumped mixture.

The separator comprises an upright cylindrical vessel having tangential inlet means at its upper end and a dump outlet at its base. The gas-liquid-solids production mixture enters the vessel chamber through the inlet means and is spun, to form a central gas vortex and an outer, downwardly descending liquid-solids mixture. The separated gas leaves the chamber through an outlet line at the upper end of the vessel. The liquid-solids mixture accumulates as a batch in a collection zone in the lower end of the vessel chamber. Elements are provided for maintaining a generally constant backpressure in the vessel, to provide the drive needed for discharging the batch of liquid-solids mixture therefrom. A pair of pressure sensors are positioned in the chamber, one at the base of the chamber and the other part way up its length. These pressure sensors are connected with a unit adapted to measure the pressure differential and emit a signal indicative thereof. When the pressure differential signals reach a pre-determined value, a dump valve in the outlet line is opened by elements responsive to the signals. When the pressure differential signals reach a pre-determined minimum value, the dump valve is closed. A computer is utilized to calculate the liquid mass flow rate from the weight and time measurements.

3 Claims, 2 Drawing Figures

4,549,432

METERING SEPARATOR FOR DETERMINING THE LIQUID MASS FLOW RATE IN A GAS-LIQUID OILFIELD PRODUCTION STREAM

BACKGROUND OF THE INVENTION (a) Field of the Invention

The present invention relates to a metering separator adapted to first separate off the gas from a stream containing both gas and liquid, and then meter the liquid to provide a mass flow rate thereof.

More particularly, the assembly comprises: means for separating and removing the greatest part of the gas from the stream; means for accumulating the de-gassified liquid; means for monitoring the increasing weight of the accumulating batch; means for dumping the batch when its weight reaches a pre-determined value; means for monitoring the time taken to accumulate the batch; and means for computing the mass flow rate of the liquid from the weight and time information so derived and displaying the results.

(b) Prior Art

The present invention has been developed in connection with monitoring the production from wells in an in situ combustion project. While the invention is expected to find application as a meter outside this particular type of operation, the problems associated with metering combustion project streams will be discussed below, to illuminate the qualities sought in the development of the invention.

Combustion project production wells produce streams containing a mixture of gases, oil, water and solids. The proportions of these components vary constantly and over quite wide ranges.

The wells frequently are designed to produce from both the casing annulus and the tubing. The annulus stream is usually mainly gas, but can contain substantial amounts of liquid. The tubing flow is usually liquid but can contain substantial amounts of gas. It is desirable to meter the total combined gas content of both streams and the total combined liquid content of them.

As the annulus stream is usually mainly gas, it will create operating difficulties if introduced into most separators. Thus this stream is commonly routed directly to the flare line and, in many cases, no measurement of its quantity or rate is made.

The "liquid fraction" in the two streams commonly comprises viscous emulsions, which comprise oil, water and gases. Volume measurement is therefore ineffective, because of the unknown quantity of contained gas. In addition, flow of the viscous liquid fraction through pipelines and meters is complex; laminar flow and globular flow cause differential flow velocities of the various components (free water, free gas and emulsion), so that one velocity measurement of the fluids in a line or meter is meaningless, even if the density of the mixture could be determined.

It is desirable to meter this gas content in the production. Therefore it is a preferred object of this invention to provide a separator adapted to accept and meter both the casing and tubing flows at the same time.

One prior art device which has found commercial application in connection with metering the tubing stream of an in situ combustion production well can be referred to as a pivoting bucket meter. This meter involves a V-shaped container having two side-by-side, open-topped compartments. The container is pivotally mounted at its base, so that each compartment can tip back and forth between fill and discharge positions. In the fill position, one of the compartments is positioned beneath the outlet of the production flowline. In the discharge position, the filled compartment is tipped to dump its contents. While one compartment is filling, the other is discharging. The container is counterbalanced in such a way that it requires the accumulation of a certain weight of fluid in the compartment before the container will pivot.

In the use of the pivoting bucket meter, the number of dumps, occurring in a certain time period, are counted. The mass flow rate of the liquid can be approximated by calculations based on the weight and time data so obtained.

The pivoting bucket meter has been associated with certain problems, when used in connection with the production from an in situ combustion project. These problems mainly arise from the relatively high concentrations of gas in the production stream. When the stream is de-pressurized, by discharging into the open-topped compartment, much foam is generated. The possibility then exists that the production will overflow the compartment, without enough weight having been accumulated to pivot the compartment to the discharge mode. This of course deleteriously affects the metering operation and creates an undesirable spill.

The patent prior art discloses the concept of first separating the gas from the production stream and then metering the residue liquid. This is, for example, disclosed in U.S. Pat. No. 2,936,622, issued to Glasgow. The Glasgow reference is of interest because it teaches centrifuging the production stream in an upper chamber, to separate gas from the liquid. The gas is vented through a top outlet. The residue liquid then passes through a transfer line into a second chamber positioned beneath the first. Here the liquid is accumulated until it contacts and raises a float. The movement of the float initiates the closing of a valve in the transfer line and the opening of a dump valve in an outlet line from the second chamber. When the liquid has substantially drained from the second chamber, a second float at the base of the chamber is lowered and causes reversal of the valves.

In summary, the Glasgow unit couples gas separation with float-controlled volume metering.

Separators which use floats as the controlling means have been found wanting when used to meter in situ combustion project streams. This is because the gas in the emulsion is difficult to remove completely and foam is still present in the metering chamber. This foam will activate the float prematurely and result in an inaccurate reading of the true liquid volume being passed.

A third approach to metering this type of production involved simply producing it into a storage tank and timing the accumulation. The production then is held in the tank long enough to allow the bulk of the gas to break out and be vented. The residue is then measured and centrifuging of samples will give a breakdown of the oil, water and solids. With this information, the mass flow rate of the oil can be calculated.

However, while accurate, this type of metering yields data that may be several days old. It is preferable that the information be as current as possible, for purposes of analyzing well pumping problems and understanding what may be taking place in the sub-surface reservoir.

There is thus still a need for a device capable of accurately monitoring the liquid content mass flow rate of a gassy oil stream, such as the combined casing and tubing production of an in situ combustion project production well.

SUMMARY OF THE INVENTION

The present invention is based on the concept of uniting, in one vessel, means for conducting the steps of:

(1) separating by centrifugal action substantially all of the gas in the stream from the liquid, with concomitant removal of the gas from the vessel as an overhead stream;

(2) accumulating the de-gassified liquid in a collection zone positioned beneath the gas separation zone;

(3) monitoring (that is, repeatedly making a measure of) the increasing weight of the accumulating batch of liquid, until it reaches a predetermined value, then opening an outlet in the base of the vessel to dump the batch from the chamber, and monitoring the decreasing weight of that part of the draining batch which remains in the chamber, until it reaches a pre-determined minimum value, and then closing the outlet, at which time the procedure is repeated;

(4) maintaining a generally constant backpressure in the chamber throughout and using this pressure to quickly dump the batch;

(5) noting the time taken to accumulate each batch;

(6) and computing the approximate mass flow rate of the liquid using the weight and time information so acquired.

The separator incorporating this combination of features has been shown to be capable of handling simultaneously both the annulus and tubing streams.

In the float-operated measuring systems, the upper float must be positioned at the level point reached by the upper surface of a batch of pure liquid having the desired weight. In contradistinction, in the applicant's separator, wherein differential pressure sensors are preferably used, the upper sensor may be positioned at a point well above where the liquid column would reasonably be expected to reach, as this sensor functions only to register the gas backpressure in the chamber. Thus, the varying height of the batch columns does not cause premature and misleading triggering of batch dumping.

DESCRIPTION OF THE PREFERRED EMBODIMENT

Figure 1:
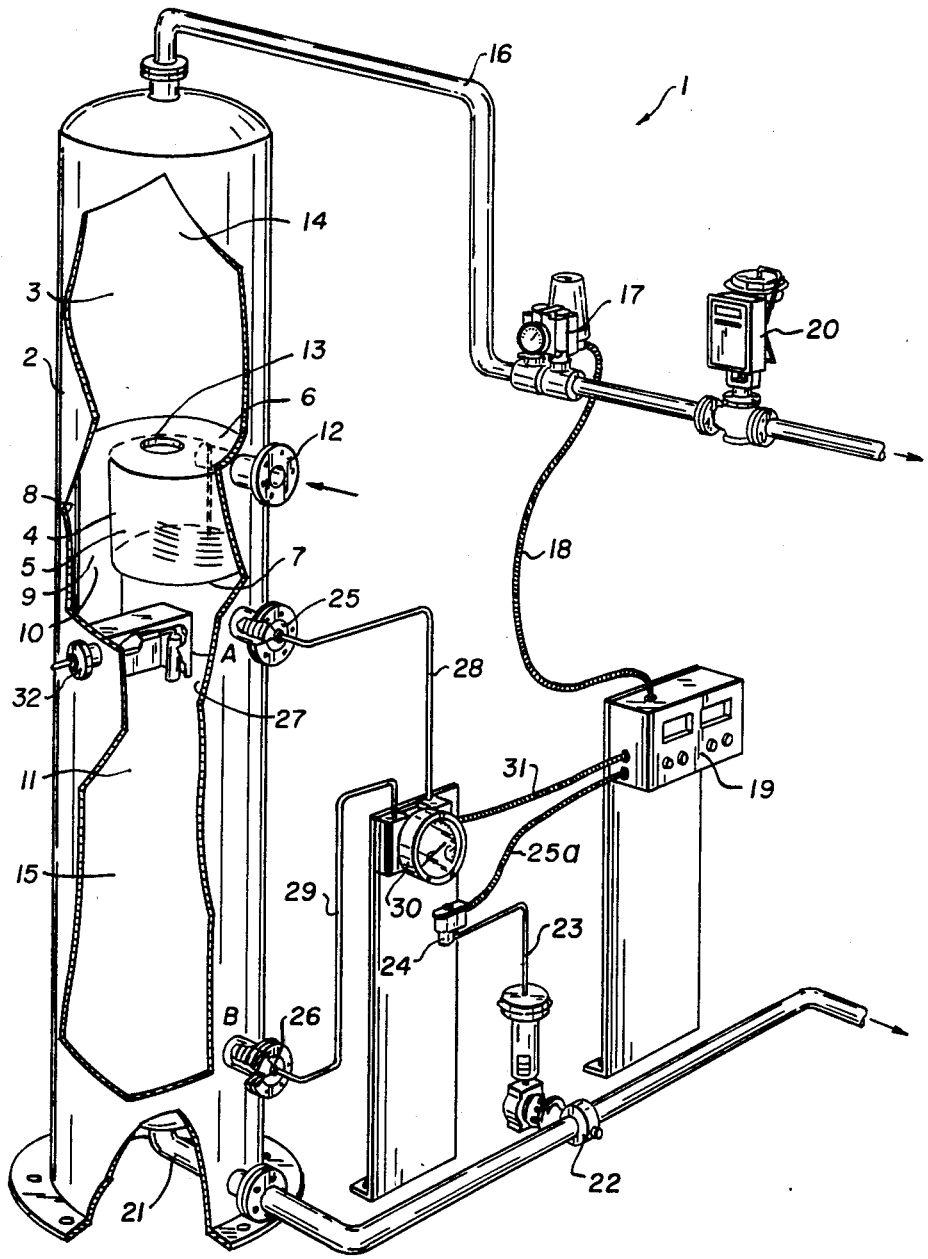
FIG. 1 is a perspective view showing the separator, including its inlet and outlet lines and controls, the sidewall of the separator vessel being partly broken away to show the vessel internals.

Having reference to FIG. 1, the separator 1 comprises a vertical, cylindrical vessel 2 closed at its top and bottom ends and forming an internal chamber 3.

Mounted within the chamber 3 adjacent its upper end is an involute inlet assembly 4 of known design. This assembly 4 comprises a vertical, spirally extending wall 5 which cooperates with transverse upper and lower walls 6,7 and the vessel side wall 8 to form an involute passageway 9 of expanding section. The passageway 9 terminates in an outlet 10, which communicates with the lower end of the chamber 3, referred to hereinafter as the liquid collection zone 11. A production inlet pipe 12 extends through the vessel side wall 8 and discharges tangentially against the inner end of the spiral wall 5.

Thus the production stream can be introduced by the inlet pipe 12 to contact the spiral wall 5. The stream follows the wall 5, which induces it to spin. As the "diameter" of the spiral wall 5 at its inner end is relatively small, the stream is spun at high velocity at the inner end of the passageway 9. This causes most of the contained gas to break out and form a gas vortex 13, which moves upwardly into the upper end 14 of the chamber 3. The remaining components of the stream (referred to hereinafter as "the liquid") continue through the passageway 9 at a diminishing velocity, as they spread out through its expanding cross-sectional area. The liquid stream exits from the passageway 9 through the outlet 10 and follows a downwardly-descending spiral path along the inner surface of the vessel side wall. It accmulates as a batch 15 in the liquid collection zone 11.

An outlet line 16 extends from the upper end of the vessel 2 and communicates with the upper end of the chamber 3. The separated gas exits from the vessel 2 through this line.

A known orifice gas flow meter 17 is mounted in the outlet flowline 16. This meter 17 is operative to generate electrical signals indicative of the flow rate of the gas passing through the line 16. These signals are transmitted through the cable 18 to the microprocessor 19.

A backpressure valve 20 (Type 4195B, available from Fisher Controls) is also mounted in the gas outlet flowline 16. This valve 20 is operative to maintain a substantially constant pressure of 20–50 psi in the chamber 3. The backpressure is required to ensure rapid discharge of each batch 15 of accumulated liquid.

A dump line 21 extends from the lower end of the vessel 2 and communicates with the chamber 3. The batches 15 of accumulated liquid are removed from the separator through this dump line 21.

A solenoid-controlled pneumatic dump valve 22 (Type 1052, available from Fisher Control), is mounted in the line 21. This valve 22 is operative, when opened, to permit liquid accumulated in the collection zone 11 to discharge. When the batch 15 of liquid is being accumulated, this valve 22 is closed. The valve 22 is connected by the tubing 23 to the solenoid 24. The solenoid 24 is, in turn, connected by cable 25 to the microprocessor 19. As described below, the microprocessor 19 is operable to actuate the solenoid 24, to open and close the dump valve 22.

Upper and lower pressure sensors 25, 26 are mounted in the vessel side wall 8 and extend into the chamber 3, at points A and B respectively. The lower sensor 26 is positioned in the liquid collection zone 11, close to the base of the vessel 2. The upper sensor 25 is positioned in a gas disengagement zone 27 extending between the liquid collection zone 11 and the base of the inlet assembly 4. Thus the upper sensor 25 is well above the upper end of the liquid collection zone 11 and is exposed only to the gas pressure within the chamber 3. The bottom sensor 26 is exposed to the combined gas pressure and the head of liquid accumulated above it.

The sensors 25, 26 (Type 351, available from ITT Barton Instruments) are operative to transmit signals, indicative of the pressure at points A and B respectively, through the cables 28, 29 to the differential pressure unit 30 (Model 224, available from ITT Barton Instruments). The differential pressure unit 30 is operative to generate a signal indicative of the pressure differential existing between points A and B, which is transmitted through cable 31 to the microprocessor 19.

Figure 2:
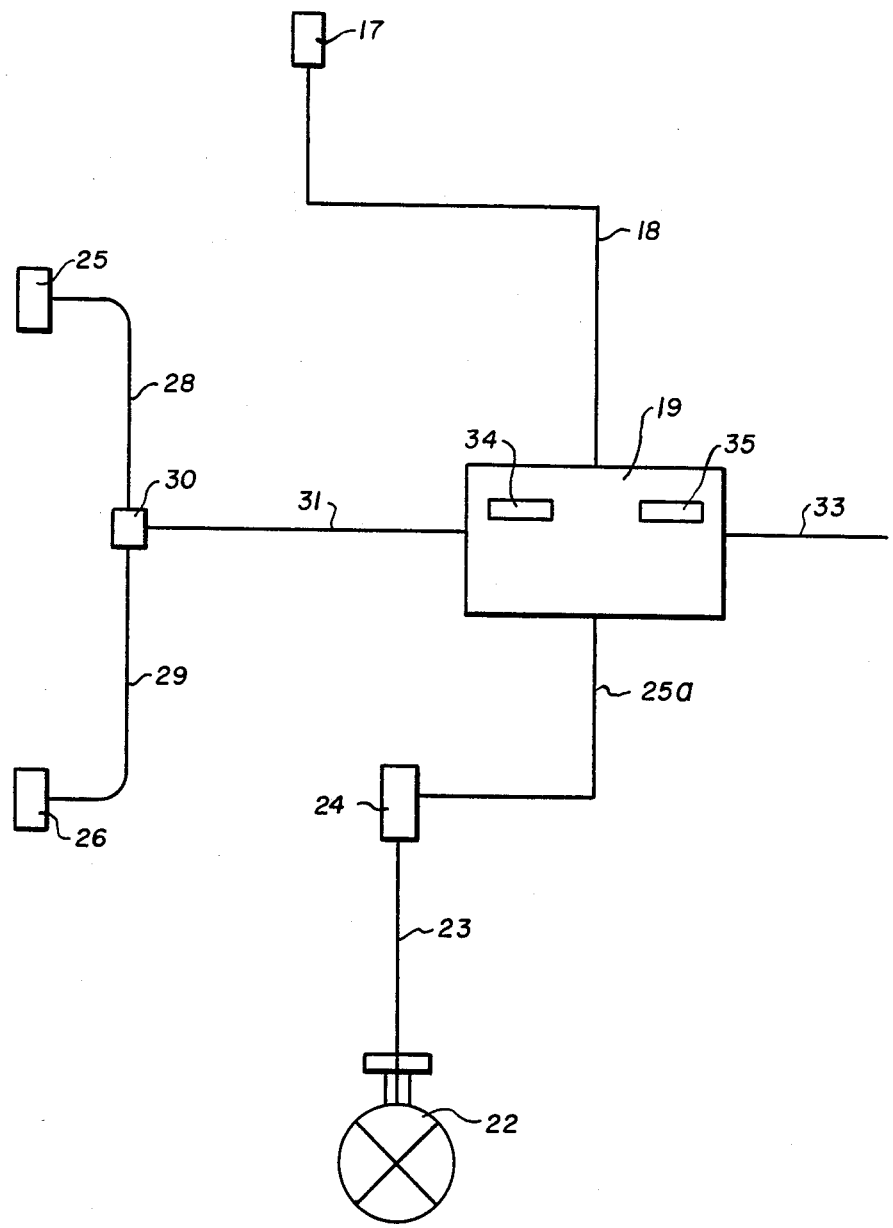
FIG. 2 is a schematic showing the controls and microprocessor.

With reference to the schematic diagram of FIG. 2, the microprocessor 19 comprises, in essence, a computer which is operative to receive information from differential pressure cell 30 and the gas flowmeter 17 via cables 31 and 18. An internal clock (not shown) within microprocessor 19 records time. The microprocessor is pre-programmed with data pertaining to separator vessel cross-sectional area and gas flowmeter characteristics.

As the differential pressure signal from the differential pressure cell 30 increases from its lowest value, microprocessor 19 measures the fill time. When the signal from differential pressure cell 30 reaches a pre-determined high value, the timing of the fill cycle stops electronically in the microprocessor 19, at which time solenoid 24 is signalled to commence the dump cycle.

The microprocessor 19, knowing the change in differential pressure, the cross-sectional area of the vessel, the mass of fluid, and the time increment for the fill cycle, computes the mass flowrate of fluid into the vessel. The microprocessor performs the mass divided by time calculation to give the mass flowrate. As the separator performs the dump cycle during part of the fill cycle, the time increment for dumping is accounted for and computed accordingly.

When the dump cycle has proceeded so that the differential pressure cell 30 feeds a signal to the microprocessor 19 equivalent to the pre-determined low value, a signal is transmitted by the cable 25a to solenoid 24, which rapidly closes outlet valve 22.

The gas flowrate from gas outlet line 16 is similarly computed in the microprocessor 19 and integrated over a period of time to give a total gas flowrate.

The microprocessor 19 may be provided with digital displays 34 and 35, to provide on-site readings of instantaneous flowrate and total fluid produced over a given time period.

A float assembly 32 (Type 244V-Model 2900, available from Fisher Controls) is mounted in the vessel wall 8 and extends into the gas disengagement zone 27. This float assembly 32 functions as an overflow shut off. In the event that the dumping system is not working, the float assembly 32 is used, in conventional manner, to activate a valve (not shown) in the production line from the well.

As an alternative to the pressure sensor system which has been tested and described, it is contemplated that one could mount the vessel on a support assembly and use load cells associated therewith to monitor the increasing weight of the unit. Flexible lines would have to be used to feed and dump such a unit.

The scope of the invention is defined in the following claims.

The embodiments of the invention in which an exclusive property or privilege is claimed are defined as follows:

1. A metering separator for metering the liquid content of a production well stream containing liquid and gas, comprising:
   a closed vessel forming a single internal chamber having an upper gas separation zone and a lower liquid collection zone;
   means, associated with the vessel, for introducing the stream into the upper zone and inducing it to spin to form a central gas vortex and an outer, downwardly descending, liquid-containing layer and thereby separating the greatest part of the gas from the liquid-containing fraction, which latter fraction accumulates as a batch in the liquid collection zone;
   outlet means, associated with the lower end of the vessel and communicating with the chamber, for removing collected liquid therefrom;
   means, associated with the outlet means, for controlling liquid removal therethrough;
   gas outlet means, associated with the upper end of the vessel and communicating with the chamber, for removing separated gas therefrom;
   means, associated with the gas outlet means, for maintaining backpressure within the chamber;
   means, associated with the vessel, for monitoring the weight of the head of liquid in the collection zone and generating signals indicative of said weight;
   control means, associated with the monitoring means and the liquid removal controlling means, for receiving said signals and opening said controlling means, when the signals indicate that a batch of a first pre-determined weight has been accumulated, and closing said controlling means, when the signals indicate that the liquid still remaining in the collection zone has a weight equal to a second pre-determined value;
   means for monitoring the times taken to accumulate and discharge each batch;
   and means, associated with said weight and time monitoring means, for computing and displaying an indication of the mass flow rate of liquid passing through the vessel.

2. A metering separator for metering the liquid content of a production well stream containing liquid and gas, comprising:
   a closed, generally cylindrical vessel forming a single internal chamber having an upper gas separation zone and a lower liquid collection zone;
   means, associated with the upper end of the vessel, for introducing the stream into the upper zone and inducing it to spin to form a central gas vortex and an outer, downwardly-descending, liquid-containing layer which accumulates as a batch in the liquid collection zone;
   outlet means, associated with the lower end of the vessel and communicating with the chamber, for removing collected liquid therefrom;
   dump valve means, associated with the outlet means, for controlling liquid removal therethrough;
   gas outlet means, associated with the upper end of the vessel and communicating with the chamber, for removing separated gas therefrom;
   means, associated with the gas outlet means, for maintaining backpressure within the chamber;
   first and second pressure sensors mounted in vertically spaced apart relationship in the vessel wall, the upper sensor being operative to measure only the gas backpressure in the chamber, the lower sensor being operative to measure the combined head of the gas backpressure and the head of liquid extending above said sensor, said sensors being further operative to transmit pressure signals indicative of said measurements;
   first means, operatively connected to the sensors, for establishing a measure of the differential pressure and emitting a signal indicative thereof;
   second means, operatively connected to the first means and the dump valve means, for monitoring said differential pressure measurements and opening said dump valve means, when the signals indicate that a batch of a first pre-determined weight has been accumulated, and closing said dump valve means, when the signals indicate that the liquid still remaining in the collection zone has a weight equal to a second pre-determined value;

means for monitoring the times taken to accumulate and discharge each batch;

and means, associated with said weight and time monitoring means, for computing and displaying an indication of the mass flow rate of liquid passing through the vessel.

3. A method for metering, in a generally cylindrical vessel defining a single closed chamber, the liquid production of a production well producing a flow of gas and liquid, comprising:

introducing the flow tangentially into the upper end of the chamber to cause it to spin, whereby the gas forms a central vortex and the liquid forms an outer downwardly descending layer;

venting the separated gas from the chamber, while maintaining back pressure therein;

collecting the liquid as a batch in the lower end of the chamber;

sensing the pressure differential existing between a point adjacent the base of the chamber where a head, equivalent to the back-pressure plus the head of the batch, exists, and a point spaced thereabove, where the head is only equivalent to that of the backpressure;

dumping substantially all of the batch of collected liquid from the chamber when the pressure differential indicates that a desired weight of liquid has accumulated;

monitoring the times taken to accumulate and dump the said weight;

and computing and displaying an indication of the mass flow rate of the liquid passing through the vessel.

* * * * *